United States Patent
Utsunomiya (10) Patent No.: US 7,274,577 B2
(45) Date of Patent: Sep. 25, 2007

(54) ELECTRONIC INSTRUMENT HAVING BOOSTER CIRCUIT

(75) Inventor: Fumiyasu Utsunomiya, Chiba (JP)

(73) Assignee: Seiko Instruments Inc. (JP)

(*) Notice: Subject to any disclaimer, the term of this patent is extended or adjusted under 35 U.S.C. 154(b) by 294 days.

(21) Appl. No.: 11/141,875

(22) Filed: Jun. 1, 2005

(65) Prior Publication Data

US 2005/0265052 A1    Dec. 1, 2005

(30) Foreign Application Priority Data

Jun. 1, 2004   (JP)   ............................. 2004-163086
Apr. 20, 2005  (JP)   ............................. 2005-122010

(51) Int. Cl.
  *H02H 3/18*   (2006.01)
  *G05F 1/40*   (2006.01)
  *H02J 7/00*   (2006.01)

(52) U.S. Cl. ..................... 363/59; 323/271
(58) Field of Classification Search ........... 363/59, 363/60; 323/265, 268, 271, 282, 284, 285, 323/288
See application file for complete search history.

(56) References Cited

U.S. PATENT DOCUMENTS 5,365,305 A * 11/1994 Seki et al. .................. 396/279
6,459,330 B2 * 10/2002 Yasue ......................... 327/538
7,129,679 B2 * 10/2006 Inaba et al. ................. 323/222
7,180,275 B2 *  2/2007 Reithmaier ................. 323/222

* cited by examiner

*Primary Examiner*—Matthew V. Nguyen
(74) *Attorney, Agent, or Firm*—Adams & Wilks (57) ABSTRACT

Provided is an electronic instrument in which a starting voltage of a power supply is less than a starting voltage of a general booster circuit, and which is capable of starting efficiently. The electronic instrument includes: a power supply for supplying power; a first booster circuit that is started with the power from the power supply; a capacitor for storing power of the first booster circuit; a second booster circuit that is started with the power in the capacitor; a load circuit operating with power of the second booster circuit; a voltage detection circuit for detecting a voltage of the capacitor; and a switching element controlled by a voltage detection signal, in which, when determining that the voltage of the capacitor is a predetermined voltage or more, the voltage detection circuit turns off the switching element and starts the second booster circuit with the power of the capacitor.

8 Claims, 5 Drawing Sheets

ELECTRONIC INSTRUMENT HAVING BOOSTER CIRCUIT

BACKGROUND OF THE INVENTION

1. Field of the Invention

The present invention relates to a booster circuit of an electronic instrument, in particular, an electronic instrument in which an input voltage is less than a starting voltage of a general booster circuit.

2. Description of the Related Art

When a voltage of power supplied to an electronic instrument by a power supply is lower than that of a load circuit carrying out a desired function, it is necessary to convert, by using a booster circuit, the power from the power supply into boosted power of a voltage at which the load circuit can be operated, and to operate the load circuit by use of the boosted power. However, in recent years, power supplies in each of which the voltage of the supplied power is less than the starting voltage of the booster circuit have been increased as a result of consideration of downsizing, weight reduction, cost reduction, a design, and convenience. Accordingly, the power from the power supply as described above is becoming increasingly unusable for the operation of the load circuit.

For example, a fuel cell or solar cell of a single-cell type applies to the above-described condition. In this case, the voltage of the supplied power becomes 0.5 V to 0.9 V in the fuel cell and 0.3 V to 0.7 V in the solar cell, and the booster circuit cannot be started at such voltages. Accordingly, the power of these batteries is unusable for the operation of the load circuit.

Further, in the case where a capacitor such as an electric double layer capacitor has been discharged to a voltage less than the starting voltage of the booster circuit, the rest of power is unusable for the operation of the load circuit.

Still further, considering the above description, a thermoelectric element using the Seebeck effect is supplied with power of a voltage at which a usual load circuit cannot be started, and accordingly, the generated power is unusable for the operation of the load circuit.

Hence, if the starting voltage of the booster circuit can be lowered, the power from the power supply in the case where the voltage of the supplied power is low becomes usable for the operation of the load circuit. However, usually, in order to lower the starting voltage of the booster circuit, it is necessary to lower a threshold voltage of a driver transistor or the like in the booster circuit. In this case, an off-leak current of the driver transistor or the like is increased, and boosting efficiency is deteriorated owing to a power loss caused by the off-leak current. Specifically, in the case of using the power as described above, utilization efficiency thereof for the operation of the load circuit is lowered.

In this connection, an electronic instrument to be described below has been devised. If a configuration of the conventional electronic instrument is adopted, the starting voltage of the booster circuit can be lowered while hardly lowering the boosting efficiency of the booster circuit.

Figure 6:
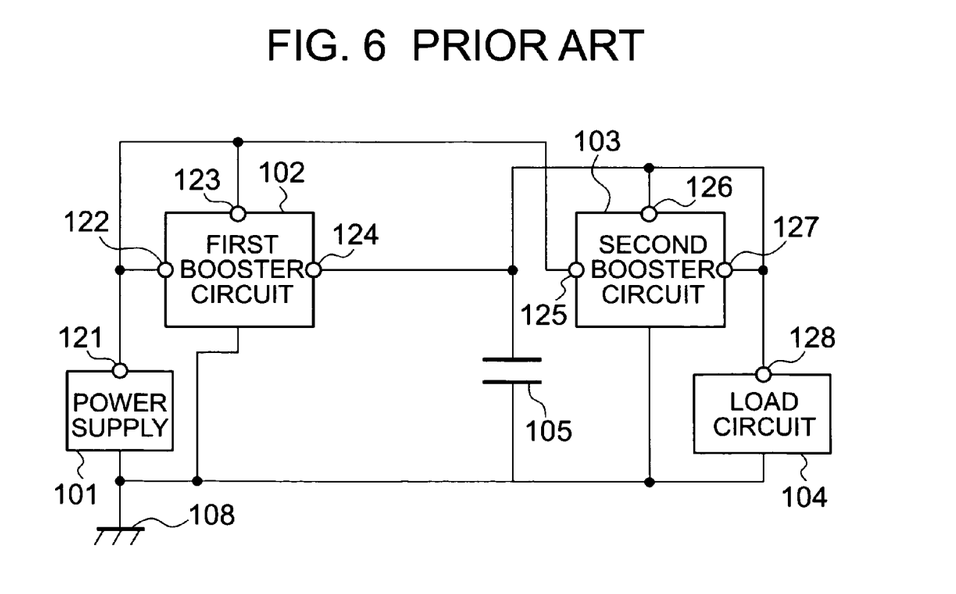
FIG. 6 is a circuit block diagram showing a conventional electronic instrument.

FIG. 6 shows a schematic circuit block diagram of the conventional electronic instrument having the feature described above.

As shown in FIG. 6, the conventional electronic instrument (for example, refer to JP 11-18419 A (FIG. 2)) includes: a power supply 101 in which the voltage of the supplied power is less than the starting voltage of the usual booster circuit; a first booster circuit 102 in which the boosting efficiency is low at a low starting voltage; a second booster circuit 103 in which the boosting efficiency is high at a high starting voltage; a capacitor 105; and a load circuit 104 carrying out a desired function. An output terminal 121 of the power supply 101 is connected individually to an input terminal 122 of the first booster circuit 102, an input terminal 125 of the second booster circuit 103, and a power supply terminal 123 of the first booster circuit 102. An output terminal 124 of the first booster circuit 102 is connected individually to one of electrodes of the capacitor 105 in which the other electrode is connected to a GND terminal 108, a power supply terminal 126 of the second booster circuit 103, an output terminal 127 of the second booster circuit 103, and a power supply terminal 128 of the load circuit 104. GND input terminals of the respective circuits and the power supply 101 are connected to the GND terminal 108. The conventional electronic instrument is configured as described above.

With the configuration described above, even if a voltage of power supplied from the power supply 101 is less than a starting voltage of the second booster circuit 103, and if the voltage concerned is equal to or more than a starting voltage of the first booster circuit 102, then the first booster circuit 102 is started by use of the power from the power supply 101, and the power from the power supply 101 can be converted into first boosted power of a voltage higher than the voltage of the power concerned and equal to or more than the starting voltage of the second booster circuit 103. In addition, the second booster circuit 103 is started by use of the first boosted power, and the power from the power supply 101 can be converted into second boosted power of a voltage higher than the voltage of the power concerned and equal to or more than an operating voltage of the load circuit 104. Accordingly, the load circuit 104 can be driven by use of the second boosted power.

Specifically, in the conventional electronic instrument described above, the second booster circuit in which the boosting efficiency is high at the high starting voltage is started by use of the first boosted power obtained by converting the power from the power supply by the first booster circuit in which the boosting efficiency is low at the low starting voltage. Then, after the second booster circuit is started, the load circuit is operated by use of the second boosted power obtained by converting the power from the power supply by the second booster circuit. Accordingly, even the power from the power supply supplying the power of the low voltage is efficiently usable for the operation of the load circuit.

The conventional electronic instrument with the configuration described above has a configuration in which the respective components such as the power supply terminal of the second booster circuit and the load circuit are connected to the output terminal of the first booster circuit. Accordingly, the first boosted power is not only consumed for charging the above-described capacitor but also consumed by the respective components described above. Note that although not being described for the configuration of the conventional electronic instrument, it has also been devised to stop the second booster circuit and the like as the respective components when the capacitor is charged with the first boosted power. However, circuit scales and the like of the respective components are large, and accordingly, power consumption thereof is not small even if the components concerned are stopped.

Hence, in the conventional electronic instrument with the configuration described above, when the first boosted power outputted by the first boosting circuit falls down to less than the power consumption of the respective components, the voltage of the capacitor does not rise to equal to or more than the voltage at which the second booster circuit can be started. Accordingly, the second booster circuit cannot be started. Therefore, it has been necessary to set a capability of the first booster circuit at a capability of outputting the first boosted power exceeding the power consumption of the respective components. Specifically, in the conventional electronic instrument with the configuration described above, it is necessary for the first booster circuit to have the capability exceeding current consumption of the components connected to the output terminal of the first booster circuit. In the general booster circuit, the higher the boosting capability is, the more an installation area and cost of the booster circuit are increased. Accordingly, the installation area and cost of the first booster circuit cannot be reduced, and as a result, there has been a problem in that the installation area and cost of the conventional electronic instrument cannot be reduced, either.

Further, in the conventional electronic instrument with the configuration described above, a charge speed for the capacitor is slowed down by the amount of power consumption of the respective components. As a result, it takes long from the supply from the power supply to the start of the second booster circuit.

Specifically, in the conventional electronic instrument with the configuration described above, there has been another problem in that it takes long from the supply of the power from the power supply to the operation of the load circuit by use of the power concerned.

According to a first means of the present invention, there is provided an electronic instrument, characterized by including: a power supply for supplying power; a first booster circuit that is started with the power from the power supply; a capacitor for storing power of the first booster circuit; a second booster circuit that is started with the power in the capacitor; a load circuit operating with power of the second booster circuit; a voltage detection circuit for detecting a voltage of the capacitor; and a switching element controlled by a voltage detection signal, in which, when determining that the voltage of the capacitor is a predetermined voltage or more, the voltage detection circuit turns off the switching element and starts the second booster circuit with the power of the capacitor.

With such a configuration as described above, a capability of the first booster circuit can be reduced, and accordingly, an actual measurement area and cost of the first booster circuit can be reduced. As a result, an installation area and cost of the electronic instrument can be reduced. Further, when the capability of the first booster circuit is not lowered, a speed for charging the capacitor is increased. Accordingly, the start of the second booster circuit can be accelerated. Therefore, the time from the supply of the power from the power supply to the use of the power for the operation of the load circuit can be shortened.

Further, according to a second means of the present invention, in addition to the first means, there is provided an electronic instrument characterized in that the switching element is on until the starting of the second booster circuit ends when it is determined that the capacitor has a predetermined voltage or more.

With such a configuration as described above, the second booster circuit can be started more reliably, and accordingly, the power from the power supply can be reliably used for the operation of the load circuit.

Still further, according to a third means of the present invention, in addition to the first means, there is provided an electronic instrument is characterized in that the first booster circuit adopts a boosting mode using a capacitor.

With such a configuration as described above, the first booster circuit can assemble the respective circuits and the capacitor in the same chip. Accordingly, the installation area and cost of the first booster circuit can be further reduced, and as a result, the installation area and cost of the electronic instrument can be further reduced.

As described above, at the time of charging the capacitor with the first boosted power of the first booster circuit, the electronic instrument of the present invention can separate the capacitor from the second booster circuit and the load circuit by means of the switching element. Accordingly, in comparison with the conventional electronic instrument in which the switching element is not provided, it is not necessary to set the capacity of the first booster circuit equal to or more than the capability for the power consumption of the second booster circuit and the load circuit, and the capability of the first booster circuit can be thus reduced to a great extent. When the capability of the first booster circuit is not lowered, the charge speed for the capacitor free from the power consumption of the second booster circuit and the load circuit can be improved. Accordingly, the time from the supply of the power from the power supply to the start of the second booster circuit can be shortened. Hence, the electronic instrument of the present invention can solve the problems inherent in the conventional electronic instrument in that it is impossible to reduce the installation area and cost of the first booster circuit because the capability thereof cannot be lowered, and in that it takes long from the supply of the power from the power supply to the operation of the load circuit by use of the power.

DETAILED DESCRIPTION OF THE PREFERRED EMBODIMENTS

A best mode for carrying out the present invention will be described below based on the drawings.

Figure 1:
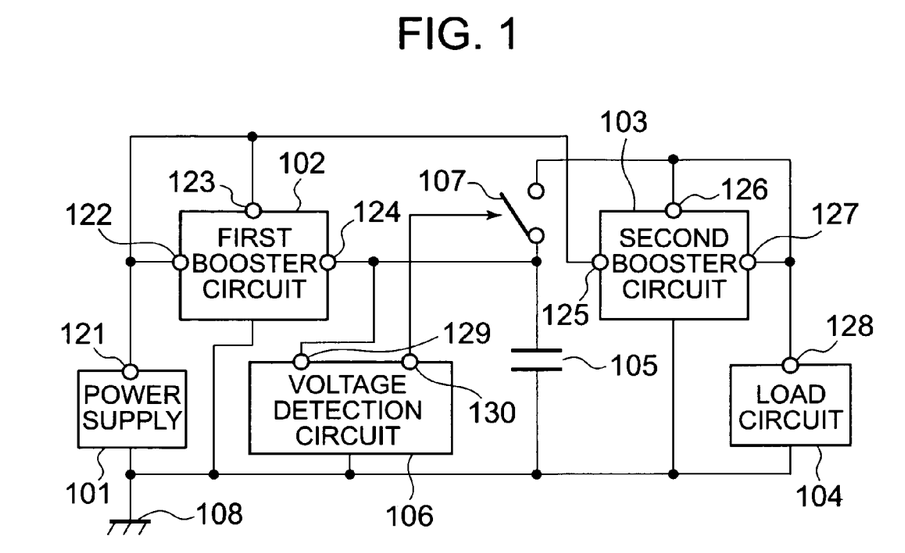
FIG. 1 is a circuit block diagram showing a best mode for carrying out the present invention.

FIG. 1 is a circuit block diagram schematically showing an electronic instrument according to the best mode for carrying out the present invention. As shown in FIG. 1, the electronic instrument has a configuration as below. The electronic instrument includes a power supply 101 for supplying power, a first booster circuit 102, a second booster circuit 103 in which a starting voltage is higher than that of the first booster circuit 102, a voltage detection circuit 106, a capacitor 105, a switching element 107, and a load circuit 104. An output terminal 121 of the power supply 101 is connected to an input terminal 122 of the first booster circuit 102, a power supply terminal 123 of the first booster circuit 102, and an input terminal 125 of the second booster circuit 103. An output terminal 124 of the first booster circuit 102 is connected to a voltage monitor terminal 129 of the voltage detection circuit 106, one of electrodes of the capacitor 105, and one of electrodes of the switching element 107. The other electrode of the switching element 107 is connected to a power supply terminal 126 of the second booster circuit 103, an output terminal 127 of the second booster circuit 103, and a power supply terminal 128 of the load circuit 104. The other electrode of the capacitor 105 and GND input terminals of the respective circuits are connected to a GND terminal 108. A signal for controlling on/off of the switching element 107 is outputted from a signal output terminal 130 of the voltage detection circuit 106.

Next, description will be made of an operation of an embodiment of the present invention with the configuration described above.

First, power of a voltage lower than the starting voltage of the second booster circuit 103 is supplied from the output terminal of the power supply 101 to the first booster circuit 102, and the first booster circuit 102 is started by use of the power. Then, the first booster circuit 102 converts the power into first boosted power, and the capacitor 105 starts to be charged with the first boosted power. At this time, a voltage of the charged capacitor 105 does not reach a predetermined voltage, and accordingly, the voltage detection circuit 106 determines that the voltage of the capacitor is less than the predetermined voltage, and outputs a voltage for turning off the switching element 107. Therefore, the switching element 107 is turned off. Then, when the voltage detection circuit 106 has detected that the voltage of the capacitor 105 is rising to reach the predetermined voltage, the voltage detection circuit 106 outputs a signal for turning on the switching element 107, and accordingly, the switching element 107 is turned on. Since the switching element 107 is turned on, stored power in the capacitor 105 is supplied to the power supply terminal 126 of the second booster circuit 103, and the second booster circuit 103 is started by use of the power stored in the capacitor 105. When the second booster circuit 103 is started, the second booster circuit 103 converts the power from the power supply 101 into second boosted power. The second boosted power is used for an operation of the load circuit 104, and in addition, is supplied also to the power supply terminal 126 of the second booster circuit 103 to be used for continuation of the operation of the second booster circuit 103.

Note that the voltage of the capacitor 105 at the time when the switching element 107 is turned on is set so as not to fall below the starting voltage of the second booster circuit 103 in consideration of the following. That is: a voltage drop of the capacitor 105 owing to power consumed in the second booster circuit 103 and the load circuit 104 during a period until the start of the second booster circuit 103; a parasitic capacitance of a node connected to the power supply terminal 126 or the like of the second booster circuit 103; and in the case of providing a smoothing capacitor for the power supply terminal 126 or output terminal 127 of the second booster circuit 103 or the power supply terminal 128 of the load circuit 104, a voltage drop of the capacitor 105, which occurs because the smoothing capacitor is charged with the stored power in the capacitor 105.

As already described in the section of the problem, in the conventional electronic instrument, when the capacitor is charged with the first boosted power outputted by the first booster circuit, the first boosted power is consumed also by the respective components connected to the capacitor, and accordingly, it is necessary to set the first boosted power larger than the current consumption of the respective components in order to charge the capacitor. Therefore, the installation area and cost of the first booster circuit cannot be reduced. Further, since the charge speed for the capacitor is slow, it takes long from the supply of the power from the power supply to the start of the second booster circuit. The conventional electronic instrument has had the problems as described above. Therefore, in the conventional electronic instrument, there have been problems that the installation area and the cost cannot be reduced and that it takes long from the supply of the power from the power supply to the operation of the load circuit by means the power. However, in the electronic instrument according to the best mode for carrying out the present invention, which is shown in FIG. 1, the configuration described above is adopted, and the operation described above is allowed to be performed thereby. In such a way, when the capacitor is charged with the first boosted power outputted by the first booster circuit, the connections between the capacitor and the respective components described above can be disconnected by the switching element, and accordingly, the first boosted power is not consumed by the respective components. Hence, even if the first boosted power is small, the capacitor can be charged if time is spent, or the time for charging the capacitor can be accelerated. Specifically, the starting time of the second booster circuit is lengthened as much as allowable, thus making it possible to downsize the first booster circuit. As a result, the electronic instrument according to the best mode for carrying out the present invention, which is shown in FIG. 1, can be downsized, and the time from the supply of the power from the power supply to the operation of the load circuit by use of the power can be shortened. Specifically, the electronic instrument according to the best mode for carrying out the present invention, which is shown in FIG. 1, can solve the problems inherent in the conventional electronic instrument.

Note that the power supply of the electronic instrument according to the best mode for carrying out the present invention, which is shown in FIG. 1, is effective for a power supply in which a voltage of supplied power falls down to less than the starting voltage of the second booster circuit in the case of considering downsizing, weight reduction, cost reduction, a design, and convenience. For example, the above-described power supply is effective for a single-cell solar cell, a single-cell fuel cell, or a capacitor such as an electric double layer capacitor.

Further, for the first booster circuit of the electronic instrument according to the best mode for carrying out the present invention, which is shown in FIG. 1, it is recommended to use a switching regulator using a coil and a transformer, or to use a booster circuit of a charge pump mode or a switched capacitor mode, which uses a capacitor. In particular, in the case of using the booster circuit of the charge pump mode or the switched capacitor mode, which uses the capacitor, since a boosting capability of the booster circuit can be reduced, the capacitor with a low capacitance value can be adopted. Therefore, the capacitor that has occupied a space as an external part can be incorporated in the same chip as that for the booster circuit. Hence, it is made possible to further downsize the first booster circuit, and as a result, it is possible to further downsize the electronic element described above.

Further, the voltage detection circuit of the electronic instrument according to the best mode for carrying out the present invention, which is shown in FIG. 1, is configured to provide a hysteresis to a detected voltage, or to provide a delay time after the voltage is detected. In such a way, provided is a circuit operation not to turn off the switching element from the turning on of the switching element to completion of the start of the second booster circuit, thus making it possible to start the second booster circuit more surely.

Still further, for the second booster circuit of the electronic instrument according to the best mode for carrying out the present invention, which is shown in FIG. 1, it is recommended to adopt one with a configuration to continue the operation by using the second boosted power as long as there is some input power once being started. Yet further, although not described in the best mode for carrying out the present invention, it is needless to say that the power from the power supply can be used for the operation of the load circuit more efficiently by stopping the operation of the first booster circuit after the second booster circuit is started.

First Embodiment

Figure 2:
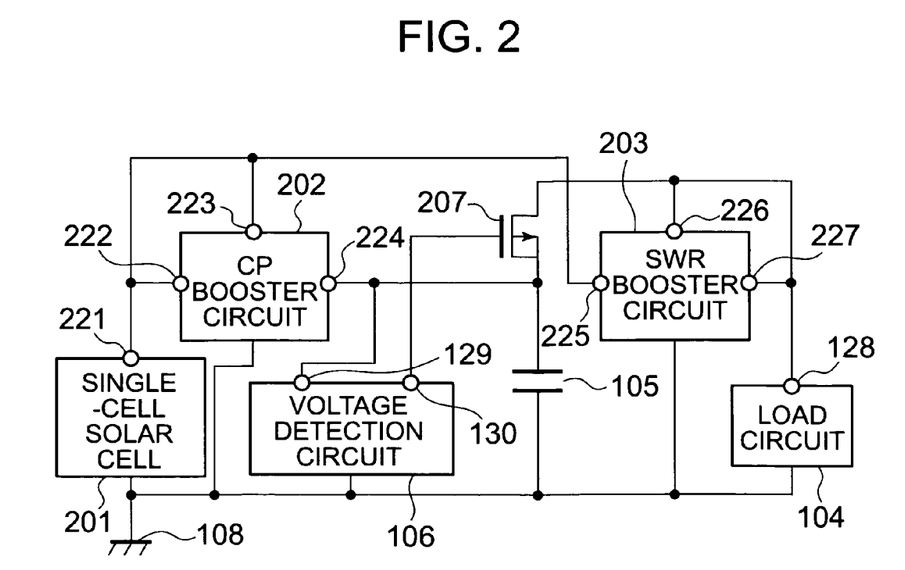
FIG. 2 is a circuit block diagram showing an electronic instrument according to a first embodiment of the present invention.

FIG. 2 is a schematic circuit block diagram showing a first embodiment of the electronic instrument of the present invention.

Description will be made below of the first embodiment of the electronic instrument of the present invention based on FIG. 2.

As shown in FIG. 2, the electronic instrument has the following configuration. Specifically, a single-cell solar cell 201 is used as the power supply 101 shown in FIG. 1, a booster circuit of the charge pump mode (hereinafter, abbreviated as a CP booster circuit) 202 is used as the first booster circuit 102 shown in FIG. 1, a P-channel type MOSFET (hereinafter, abbreviated as a PMOS) 207 is used as the switching element 107 shown in FIG. 1, and a booster circuit of the switching regulator mode (hereinafter, abbreviated as an SWR booster circuit) 203 using the coil is used as the second booster circuit 103 shown in FIG. 1. An output terminal 221 of the single-cell solar cell 201 is connected to an input terminal 222 of the CP booster circuit 202, a power supply terminal 223 of the CP booster circuit 202, and an input terminal 225 of the SWR booster circuit 203. An output terminal 224 of the CP booster circuit 202 is connected to the voltage monitor terminal 129 of the voltage detection circuit 106, one of the electrodes of the capacitor 105, a source of the PMOS 207, and a substrate electrode. A drain electrode of the PMOS 207 is connected to a power supply terminal 226 of the SWR booster circuit 203, an output terminal 227 of the SWR booster circuit 203, and the power supply terminal 128 of the load circuit 104. The other electrode of the capacitor 105 and GND input terminals of the respective circuits are connected to the GND terminal 108.

Further, for the single-cell solar cell 201, such a battery is adopted, of which output voltage at an opening time is approximately 0.6 V, from which power of approximately 1.2 W can be obtained, and of which output voltage at this time becomes 0.4 V. The CP booster circuit 202 receives power of a voltage of 0.3 V or more from the input terminal 202. Then, in this case, the electronic instrument can be started, and it is possible to output output power of a voltage of approximately 1.5 V. Further, the output power is lowered to approximately 5 µW, thus reducing the capacitance value of the boosting capacitor to incorporate the boosting capacitor concerned in the inside of the chip. The single-cell solar cell 201 is configured as described above. The voltage detection circuit 106 is operated to monitor the voltage of the capacitor 105, to turn on the PMOS 207 that has been turned off when the voltage of the capacitor 105 reaches 1.5 V, to continue turning on the PMOS 207 until the voltage of the capacitor 105 falls below 1.0 V after the PMOS 207 is turned on, to turn off the PMOS 207 when the voltage of the capacitor 105 falls below 1.0 V, and to continue turning off the PMOS 207 until the voltage of the capacitor 105 exceeds approximately 1.5 V once the PMOS 207 is turned off. The SWR booster circuit 203 is configured to be started when power of 50 µW is inputted to the power supply terminal 226 at a voltage of approximately 1.0 V or more for approximately 0.1 second, and to convert the inputted power of the single-cell solar cell 201 into power of approximately 1 W at a voltage of approximately 1.5 V, and then to output the power thus converted from the output terminal 227. Further, the SWR booster circuit 203 is configured to continue the boosting operation by use of approximately 50 µW in the power thus converted. The load circuit 104 is configured to perform a desired operation by use of the power of approximately 1 W at 1.5 V, which is outputted by the SWR booster circuit 203. Note that, if an on-resistance of the PMOS 207 is approximately 2 kΩ or less, no problem occurs on starting the SWR booster circuit 203.

Figure 3:
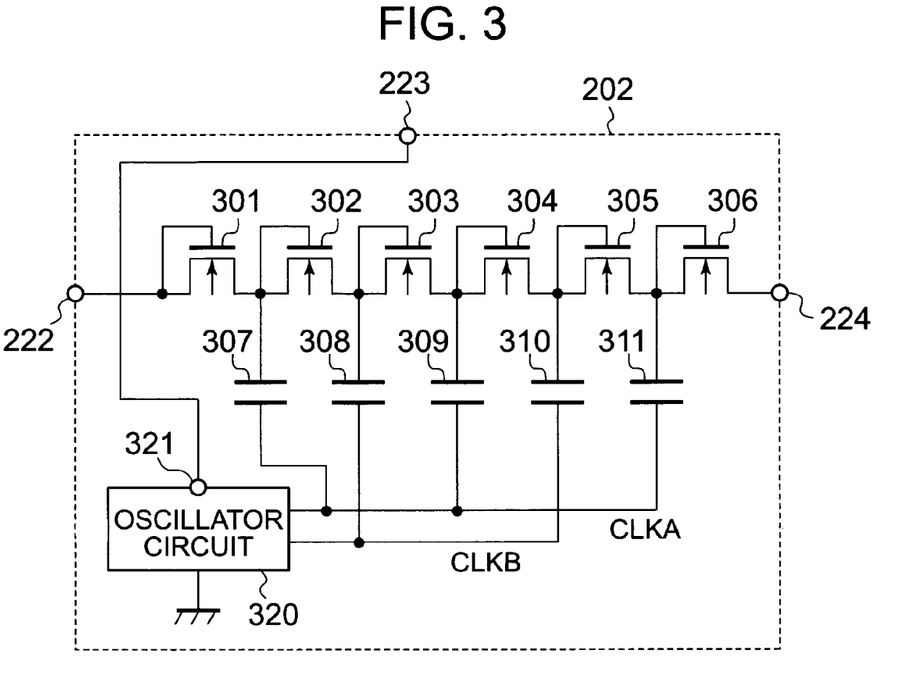
FIG. 3 is a circuit diagram of a CP booster circuit of the electronic instrument according to the first embodiment of the present invention.

FIG. 3 is a view showing a schematic circuit diagram of the CP booster circuit 202 of the first embodiment of the electronic instrument of the present invention, which is shown in FIG. 2.

Description will be made below of the configuration of the CP booster circuit 202 based on FIG. 3.

As shown in FIG. 3, the CP booster circuit 202 is composed of an oscillator circuit 320, fully-depleted N-channel type MOSFETs (hereinafter, abbreviated as FD-SOI type NMOSs) 301 to 306 using an SOI wafer, and boosting capacitors 307 to 311. The CP booster circuit 202 is configured as below. The respective FD-SOI type NMOSs 301 to 306 are individually connected to diodes. Between the input terminal 222 and output terminal 224 of the CP booster circuit 202, the diodes are connected in series so that a direction from the input terminal 222 to the output terminal 224 is a forward direction. One of electrodes of the boosting capacitor 307 is connected to a node between the FD-SOI type NMOS 301 and the FD-SOI type NMOS 302. One of electrodes of the boosting capacitor 308 is connected to a node between the FD-SOI type NMOS 302 and the FD-SOI type NMOS 303. One of electrodes of the boosting capacitor 309 is connected to a node between the FD-SOI type NMOS 303 and the FD-SOI type NMOS 304. One of electrodes of the boosting capacitor 310 is connected to a node between the FD-SOI type NMOS 304 and the FD-SOI type NMOS 305. One of electrodes of the boosting capacitor 311 is connected to a node between the FD-SOI type NMOS 305 and the FD-SOI type NMOS 306.

Note that threshold voltages of the FD-SOI type NMOSs 301 to 306 are approximately 0.15 V, and that the oscillator circuit 320 is composed of a fully-depleted CMOSFET using an SOI wafer (hereinafter, abbreviated as an FD-SOI type CMOS). Accordingly, the CP booster circuit 202 is operable when power of a voltage of 0.3 V or more, which is an extremely low voltage, is inputted to the power supply terminal 321.

Further, frequencies of the clock signal A (CLKA) and the clock signal B (CLKB), which are outputted by the oscillator circuit 320, are set at approximately 1 MHz, and it is sufficient if the power outputted from the output terminal 224 of the CP booster circuit 202 be approximately 5 μW. Accordingly, it is satisfactory if each of the boosting capacitors 307 to 311 have a capacitance of approximately 100 μF. Hence, the boosting capacitors 307 to 311 can be assembled in the same chip as that of the FD-SOI type NMOSs 301 to 306 and the oscillator circuit 320.

Specifically, the CP booster circuit having the configuration described above is adopted. In such a way, the CP booster circuit can be realized, in which the installation area is small, and the power of approximately 5 μW with the voltage obtained by boosting the voltage of 0.3 V or more to 1.5 V when the input terminal and power supply terminal of the CP booster circuit are connected to each other.

Figure 4:
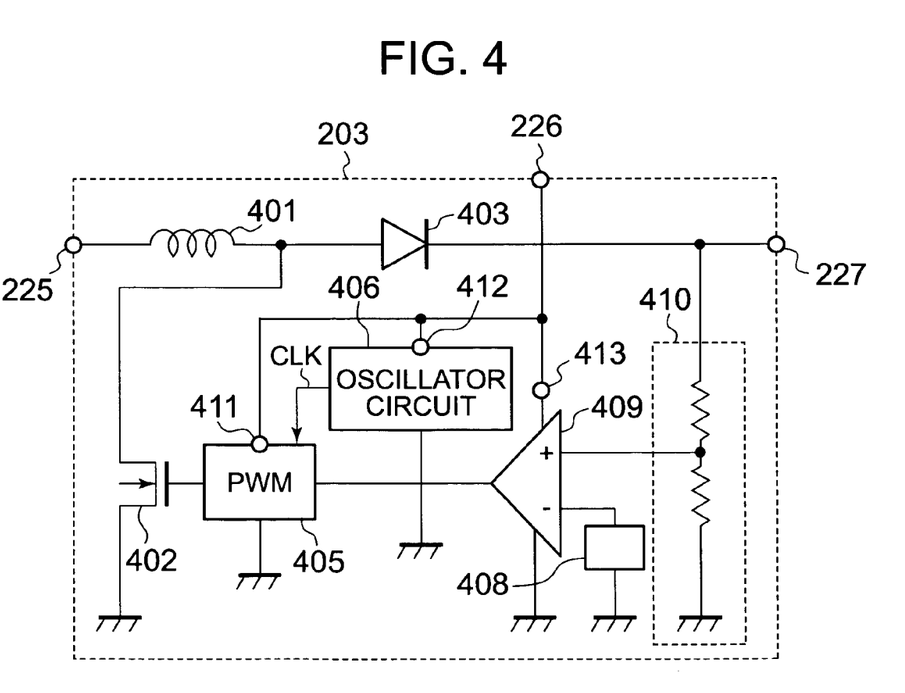
FIG. 4 is a circuit diagram of an SWR booster circuit of the electronic instrument according to the first embodiment of the present invention.

FIG. 4 is a view showing a schematic circuit diagram of the SWR booster circuit 203 of the first embodiment of the electronic instrument of the present invention, which is shown in FIG. 2.

Description will be made below of the configuration of the SWR booster circuit 203 based on FIG. 4.

As shown in FIG. 4, the SWR booster circuit 203 is composed of an oscillator circuit 406 for generating a clock signal (CLK), a bleeder resistor 410 for outputting divided voltages obtained by dividing a voltage of the output terminal 227 of the SWR booster circuit 203, a Vref circuit 408 for outputting a reference voltage, an error amplifier 409 for outputting an amplified signal of a difference between each divided voltage and the reference voltage, a PWM circuit 411 for outputting a switching signal as a signal obtained by changing an on-duty cycle of the inputted clock signal in response to the amplified signal, an NMOS transistor 402 for performing a switching operation by receiving the switching signal to a gate electrode thereof, a coil 401, and a Schottky diode 403. The SWR booster circuit 203 is configured as below. The input terminal 225 of the SWR booster circuit 203 is connected to one of electrodes of the coil 401, and the other electrode of the coil 401 is connected to a drain of the NMOS transistor 402 and a P-type electrode of the Schottky diode 403. An N-type electrode of the Schottky diode 403 is connected to a positive-side input terminal of the bleeder resistor and the output terminal 227 of the SWR booster circuit 203. The power supply terminal 226 of the SWR booster circuit 203 is connected to a power supply terminal 412 of the oscillator circuit 406, a power supply terminal 411 of the PWM circuit, and a power supply terminal 413 of the error amplifier. GND terminals are connected to a source of the NMOS transistor 402, a GND input terminal of the bleeder resistor, a GND input terminal of the error amplifier, and GND terminals of the respective circuits as described above.

The SWR booster circuit having the configuration described above is adopted. Thus, power accumulated in the coil 401 every time when the NMOS transistor 402, which repeatedly turns on and off, turns on is outputted to the output terminal 227 of the SWR booster circuit 203 through the Schottky diode 403 every time when the NMOS transistor 402 turns off. In such a way, power of a voltage higher than a voltage inputted from the input terminal 225 of the SWR booster circuit 203 is outputted from the output terminal 227 of the SWR booster circuit 203. In addition, a resistance ratio in the bleeder resistor 410 is set in advance so that each divided voltage outputted by the bleeder resistor 410 and the reference voltage outputted by the Vref circuit 408 are equal to each other when the voltage of the output terminal 227 of the SWR booster circuit 203 reaches approximately 1.5 V. Hence, the error amplifier 409 and the PWM circuit 405 adjust the on-duty cycle at the time when the NMOS transistor 402 turns on so that the output terminal 227 of the SWR booster circuit 203 reaches approximately 1.5 V, thereby adjusting the power accumulated in the coil 401, that is, power supplied to the output terminal 227 of the SWR booster circuit 203. Accordingly, the voltage of the output terminal 227 of the SWR booster circuit 203 is controlled to approximately 1.5 V.

Note that, in order to set the output power of the SWR booster circuit 203 to 1 W, a coil in which an inductance is approximately 5 μH and a direct-current resistance is approximately 50 mΩ is used for the coil 401, an NMOS transistor in which an on-resistance is approximately 50 mΩ is used for the NMOS transistor 402, and a Schottky diode in which a forward drop voltage when a current of 0.8 A flows therethrough is approximately 0.1 V is used for the Schottky diode 403. A frequency of the clock signal (CLK) outputted by the oscillator circuit 406 is set to approximately 1 MHz.

Figure 5:
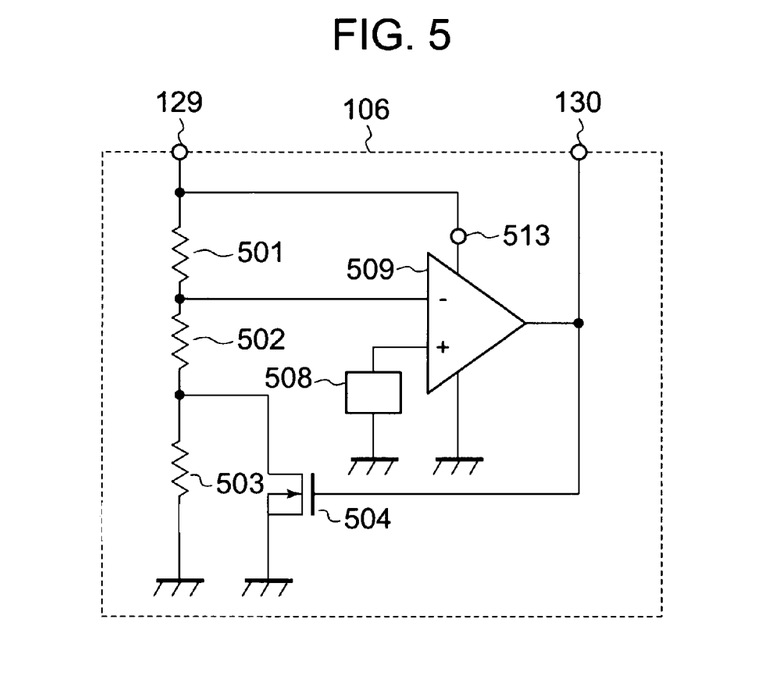
FIG. 5 is a circuit diagram of a voltage detection circuit of the electronic instrument according to the first embodiment of the present invention.

FIG. 5 is a view showing a schematic circuit diagram of the voltage detection circuit 106 of the first embodiment of the electronic instrument of the present invention, which is shown in FIG. 2.

Description will be made below of the configuration of the voltage detection circuit 106 based on FIG. 5.

As shown in FIG. 5, the voltage detection circuit 106 is configured as below. The voltage detection circuit 106 includes resistors 501, 502 and 503, a comparator circuit 509, a Vref circuit 508, and an NMOS 504. One of electrodes of the resistor 501 and a power supply terminal 513 of the comparator circuit 509 are individually connected to the monitor terminal 129 of the voltage detection circuit. The other electrode of the resistor 501 is connected to one of electrodes of the resistor 502 and a negative input terminal of the comparator circuit 509. The other electrode of the resistor 502 is connected to one of electrodes of the resistor 503 and a drain of the NMOS 504. A reference voltage outputted by the Vref circuit 508 is inputted to a positive input terminal of the comparator circuit 509, and the signal output terminal 130 of the voltage detection circuit 106 is connected individually to an output terminal of the comparator circuit 509 and a gate of the NMOS 504. GND terminals are connected to the other electrode of the resistor 503, a source of the NMOS 504, and GND input terminals of the Vref circuit 508 and the comparator circuit 509.

With the configuration described above, the voltage detection circuit 106 can perform the following operation. Specifically, when the NMOS 504 turns on, the comparator circuit 509 compares divided voltages with the reference voltage outputted by the Vref circuit 508, the divided voltages being obtained by dividing the voltage inputted from the voltage monitor terminal 129 by the resistor 501 and the resistor 502. Meanwhile, when the NMOS 504 turns off, the comparator circuit 509 compares divided voltages with the reference voltage outputted by the Vref circuit 508, the divided voltages being obtained by dividing the voltage inputted from the voltage monitor terminal 129 by the resistor 501 and a resistor formed by connecting the resistor 503 to the resistor 502 in series. When the respective divided voltages described above are lower than the reference voltage, the comparator circuit 509 can output a voltage equal to the voltage of the voltage monitor terminal 129 to the signal output terminal 130. Meanwhile, when the respective divided voltages are higher than the reference voltage, the comparator circuit 509 can output a voltage equal to the voltage of the GND terminals to the signal output terminal 130.

Note that a resistance ratio of the resistor 501 and the resistor 502 is set in advance so that the voltages divided by the resistor 501 and the resistor 502 are equal to the reference voltage when the voltage of the voltage monitor terminal 129 reaches 1.5 V. A value of the resistor 503 is set in advance so that the voltages divided by the resistor 501 and the resistor formed by connecting the resistor 503 to the resistor 502 in series can become equal to the reference voltage when the voltage of the voltage monitor terminal 129 falls down to 1.0 V.

Hence, when the voltage of the voltage monitor terminal 129 is less than 1.5 V, the voltage detection circuit 106 outputs a voltage equal to that of the voltage monitor terminal 129 from the signal output terminal 130. Meanwhile, when the voltage of the voltage monitor terminal 129 reaches 1.5 V or more, the voltage detection circuit 106 outputs a voltage equal to those of the GND terminals from the signal output terminal 130. Then, once the voltage of the voltage monitor terminal 129 reaches 1.5 V or more, the voltage detection circuit 106 can perform an operation for outputting the voltage equal to those of the GND terminals from the signal output terminal 130, that is, a detection operation having a hysteresis of 0.5 V until the voltage of the voltage monitor terminal 129 falls down to less than 1.0 V. When the voltage of the voltage monitor terminal 129 falls down to less than 1.0 V, the voltage detection circuit 106 can perform an operation for outputting the voltage equal to that of the voltage monitor terminal 129.

As described above, in the first embodiment regarding the electronic instrument of the present invention, the configuration as described above is adopted. Thus, even by using the single solar cell in which the voltage of the output power is as low as approximately 0.5 V, the output power concerned can be converted into the power of the voltage of approximately 1.5 V, by use of which the load circuit can be operated. The load circuit can be operated by use of the power thus converted.

Further, in the case of charging the above-described capacitor with the output power of the above-described CP booster circuit, the connection of the capacitor to the SWR booster circuit or the load circuit can be disconnected by the PMOS transistor 207. In such a way, even if the output power of the CP booster circuit is not set at the power exceeding the power consumption of the SWR booster circuit or the load circuit, the voltage of the capacitor can be raised to the voltage at which the SWR booster circuit can be started. Hence, the output power capability of the CP booster circuit can be reduced to a great extent, and the boosting capacitor of the CP booster circuit can be incorporated in the chip. Accordingly, such a CP booster circuit can be realized, in which the external parts are few, and the installation area is extremely small. As a result, the electronic instrument according to the first embodiment of the present invention becomes extremely compact.

Second Embodiment

Figure 7:
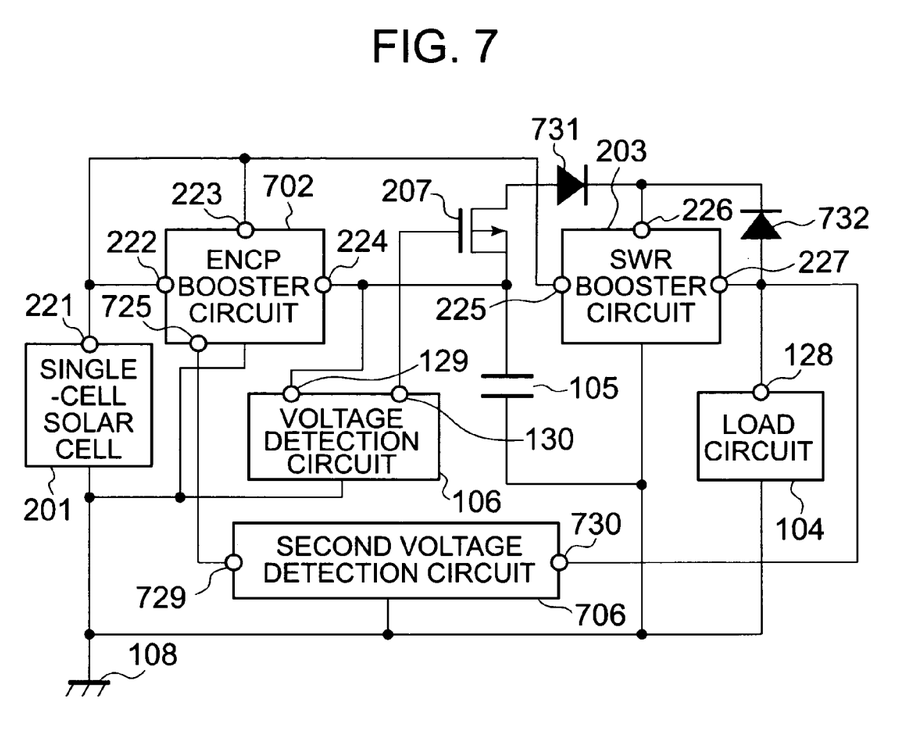
FIG. 7 is a circuit block diagram showing an electronic instrument according to a second embodiment of the present invention.

FIG. 7 is a schematic circuit block diagram showing a second embodiment of the electronic instrument of the present invention.

Description will be made below of the second embodiment of the electronic instrument of the present invention based on FIG. 7.

A configuration of the second embodiment is as follows. First, a second voltage detection circuit 706, a first Schottky diode 731 and a second Schottky diode 732 are added to the configuration of the first embodiment, which is shown in FIG. 2. Then, an ENCP booster circuit 702 having a function capable of selecting, in response to a signal inputted to a stop signal input terminal 725, whether or not the electronic instrument is to be operated is used instead of the CP booster circuit 202 shown in FIG. 2. As shown in FIG. 7, the electronic instrument is configured as below. A voltage monitor terminal 730 of the second voltage detection circuit 706 is connected to the output terminal 227 of the SWR booster circuit 203 and the power supply terminal 128 of the load circuit 104. A signal output terminal 729 of the second voltage detection circuit 706 is connected to the stop signal input terminal 725 of the ENCP booster circuit 702. The first Schottky diode 731 is provided between the drain of the PMOS 207 and the power source terminal 226 of the SWR booster circuit 203 so that a direction from the drain of the PMOS 207 to the power source terminal 226 of the SWR booster circuit 203 is the forward direction. The second Schottky diode 732 is provided between the power source terminal 226 of the SWR booster circuit 203 and the output terminal 227 of the SWR booster circuit 203 so that a direction from the output terminal 227 of the SWR booster circuit 203 to the power source terminal 226 of the SWR booster circuit 203 is the forward direction.

With the configuration as described above, in the second embodiment of the present invention, in addition to the above-described features of the first embodiment of the present invention, the second voltage detection circuit 706 monitors the voltage of the output terminal 227 of the SWR booster circuit 203 and the voltage of the power source terminal of the load circuit 104. When it has been determined that power of a desired voltage is generated, a stop signal is outputted to the stop signal input terminal 725 of the ENCP booster circuit 702, thus making it possible to stop the operation of the ENCP booster circuit 702. Hence, in the second embodiment of the present invention, the operation of the ENCP booster circuit 702 can be stopped after the SWR booster circuit 203 is started, and accordingly, by the amount thereof, the power of the single-cell solar cell 201 can be utilized more efficiently in the second embodiment of the present invention than in the first embodiment of the present invention. Further, by the first Schottky diode 731, the voltage of the output terminal 227 after the SWR booster circuit 203 is started is set higher than approximately 3 V that is a breakdown voltage of the ENCP booster circuit 702. Even if the voltage of the output terminal 227 of the SWR booster circuit 203 reaches more than 3.0 V, the voltage applied to the output terminal 724 of the ENCP booster circuit 702 can be lowered to 3.0 V or less. Accordingly, the output voltage of the SWR booster circuit 203 can be enhanced more in the second embodiment of the present invention than in the first embodiment of the present invention. Therefore, the load circuit 104 of which operating voltage is higher can be driven. Further, when the PMOS 207 is turned on by the second Schottky diode 732 and the power of the capacitor 105 is used for starting the SWR booster circuit 203, the power of the capacitor 105 is supplied only to the power source terminal 226 of the SWR booster circuit 203, and is not supplied to the output terminal 227 of the SWR booster circuit 203 and the power source terminal 128 of the load circuit 104. Hence, even in the case where the current consumption of the load circuit 104 is large and where a capacitance value of an output smoothing capacitor necessary to be attached to the output terminal 227 of the SWR booster circuit 203 is large, the SWR booster circuit 203 can be started without increasing the stored power in the capacitor 105. Hence, even if the output smoothing capacitance of the SWR booster circuit 203 is large and the power consumption of the load circuit 104 is large, the amount of power stored in the capacitor 105 can be made smaller in the second embodiment of the present invention than in the first embodiment of the present invention. Accordingly, the time required for starting the SWR booster circuit 203 can be shortened.

Specifically, as described above, rather than in the first embodiment of the present invention, in the second embodiment of the present invention, the power of the single-cell solar cell as the power supply can be utilized more efficiently, and the load circuit of which operating voltage is higher can be driven, and further, the time from the start of power generation by the single-cell solar cell to the drive of the load circuit can be shortened.

Note that, although description has been made of, as an example, the case of using the Schottky diodes as rectifying elements in the second embodiment of the present invention, it is needless to say that any element can be used as long as it has a rectifying function.

Figure 8:
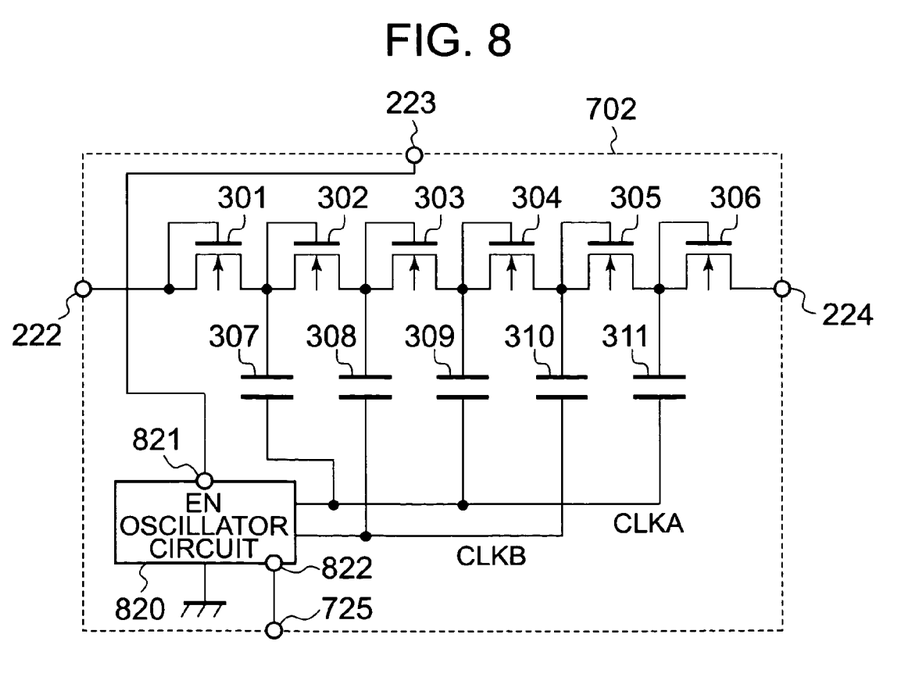
FIG. 8 is a circuit diagram of an ENCP booster circuit of the electronic instrument according to the second embodiment of the present invention.

FIG. 8 is a schematic circuit diagram of the ENCP booster circuit 702 in the second embodiment of the present invention, which is shown in FIG. 7. The configuration of the ENCP booster circuit 702 is almost the same as in the circuit diagram of the CP booster circuit 202 shown in FIG. 3, and is different therefrom only in that the oscillator circuit 320 is replaced by an EN oscillator circuit 820 and that the stop signal input terminal 725 is newly provided and connected to an EN terminal 822 of the EN oscillator circuit 820.

Figure 9:
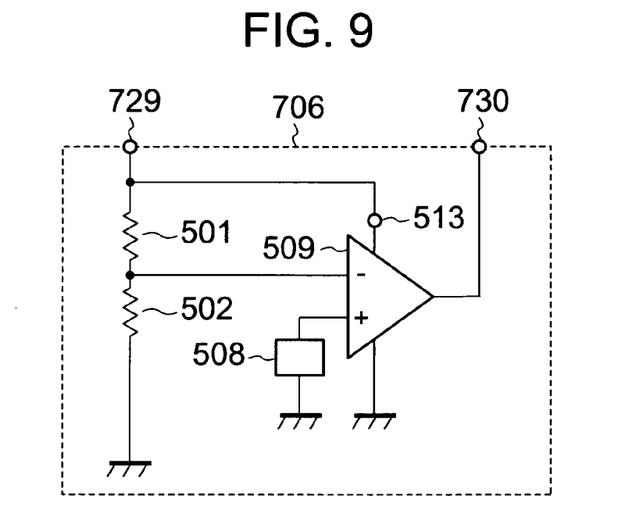
FIG. 9 is a circuit diagram of a second voltage detection circuit of the electronic instrument according to the second embodiment of the present invention.

With the configuration described above, in addition to the function of the CP booster circuit 202 shown in FIG. 3, it is possible to add a function to stop the operation of the ENCP booster circuit 202 in response to the signal inputted from the stop signal input terminal 725. FIG. 9 is a schematic circuit diagram of the second voltage detection circuit 706 in the second embodiment of the present invention, which is shown in FIG. 7. The configuration of the second voltage detection circuit 706 is almost the same as the voltage detection circuit 106 shown in FIG. 5, and is different therefrom in that the resistor 503 and the NMOS transistor 504 are detached and that a connection portion of the resistor 502 and the resistor 503 is connected to the GND terminal.

With the configuration described above, a usual voltage detection circuit can be realized from which the hysteresis to detect the voltage is eliminated, the hysteresis being provided to the voltage detection circuit 106 shown in FIG. 5.

Third Embodiment

Figure 10:
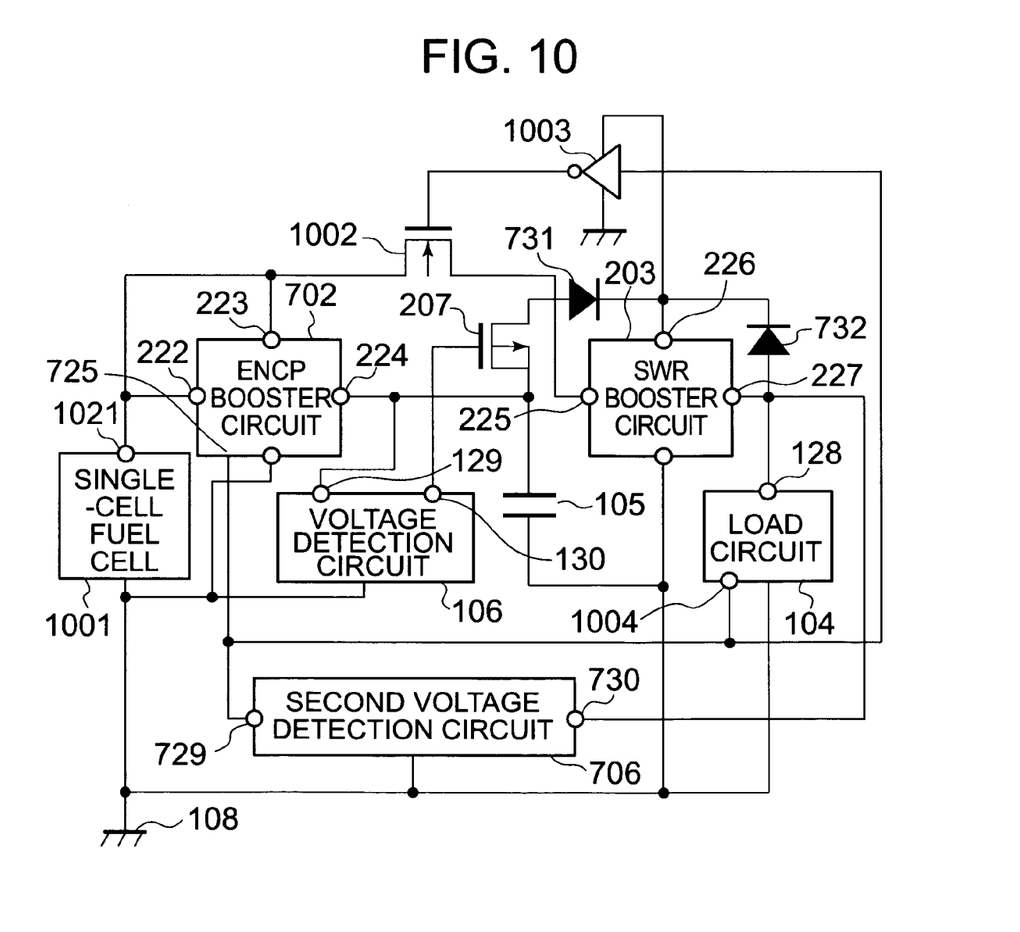
FIG. 10 is a circuit block diagram showing an electronic instrument according to a third embodiment of the present invention.

FIG. 10 is a schematic circuit block diagram showing a third embodiment of the electronic instrument of the present invention.

Description will be made below of the third embodiment of the electronic instrument of the present invention based on FIG. 10.

A configuration of the third embodiment is as follows. First, an NMOS transistor 1002 as the switching element, an inverter circuit 1003, and a function to output, to the load circuit 104, an input stop signal as a signal for stopping the consumption of the power from the power supply in the SWR booster circuit 203 and the ENCP booster circuit 702 are added to the configuration of the second embodiment shown in FIG. 7. In addition, an input stop signal output terminal 1004 for outputting the input stop signal is added to the configuration of the second embodiment, and a single-cell fuel cell 1001 is provided instead of the single-cell solar cell 201 as the power supply. The electronic instrument of the third embodiment is configured as below. An output terminal 1021 of the single-cell fuel cell 1001 is connected to the input terminal 222 and power supply terminal 223 of the ENCP booster circuit 702 and a drain of the NMOS 1002. A source of the NMOS 1002 is connected to the input terminal 225 of the SWR booster circuit 203. The input stop signal output terminal 1004 of the load circuit 104 is connected to the stop signal input terminal 725 of the ENCP booster circuit 702, the signal output terminal 729 of the second voltage detection circuit 706, and an input terminal of the inverter circuit 1003. An output terminal of the inverter circuit 1003 is connected to a gate of the NMOS 1002, and a power supply of the inverter circuit 1003 is common to the power supply of the SWR booster circuit 203. The rest of configuration is the same as that of the second embodiment of the present invention, which is shown in FIG. 7. Note that, in this configuration, a higher priority is given to the input stop signal outputted from the input stop signal output terminal 1004 of the load circuit 104 than to the signal outputted from the signal output terminal 729 of the second signal detection circuit 706.

Next, in addition to the operations of the embodiments as already described above, the following operations are performed. In the case of stopping the supply of power from the single-cell fuel cell 1001 to the ENCP booster circuit 702 and the SWR booster circuit 203, a "high" voltage that is an equal voltage to the voltage of the power supply terminal 128 of the load circuit 104 is outputted from the input stop signal output terminal 1004 of the load circuit 104, the ENCP booster circuit 702 stops the operation thereof according to this "high" signal, and the output terminal of the inverter circuit 1003 outputs a "low" voltage that is an equal voltage to the voltage of the GND terminal 108. Accordingly, the NMOS transistor 1002 is operated to turn off. Meanwhile in the case of not stopping the supply of power from the single-cell fuel cell 1001 to the ENCP booster circuit 702 and the SWR booster circuit 203, a "low" voltage that is an equal voltage to the voltage of the GND terminal 108 is outputted from the input stop signal output terminal 1004 of the load circuit 104, the ENCP booster circuit 702 continues the operation thereof at this "low" voltage, and the output terminal of the inverter circuit 1003 outputs the "high" voltage that is equal to the voltage of the power supply terminal 226 of the SWR booster circuit 203. Accordingly, the NMOS transistor 1002 is operated to turn on.

Specifically, in the third embodiment of the present invention, which is shown in FIG. 10, the configuration described above is adopted. Thus, a feature that it is possible for the load circuit 104 to control whether or not the power from the power supply is to be supplied to the ENCP booster circuit 702 and the SWR booster circuit 203 can be added to the features of the second embodiment of the present invention, which is shown in FIG. 7. Hence, in the third embodiment of the present invention, the feature that the power from the power supply is not consumed in the ENCP booster circuit and the SWR booster circuit when it is unnecessary to supply the power to the load circuit and the like is added to the features of the second embodiment of the present invention. Accordingly, in the third embodiment of the present invention, a feature that it is possible to operate the load circuit for a long time in the case of using a power supply in which the power has limitations, such as the fuel cell and the electric double layer capacitor, and a feature that power consumption at the time of supplying fuel can be minimized when the power supply is the fuel cell, leading to an improvement of durability, can be added to the features of the second embodiment of the present invention.

Further, the power supply for the inverter circuit 1003 is made common to that for the power supply terminal 226 of the SWR booster circuit 203. In such a way, when the power is supplied from the fuel cell 1001 from a state where the boosted power is not supplied to the load circuit 104 in a state where the power is not supplied from the fuel cell 1001, the boosted power is surely generated, thus enabling the load circuit 104 to be operated. This is also one of the features of the third embodiment of the present invention. This is because, since the threshold voltage of the NMOS transistor 1002 is high for the purpose of reducing an off-leak current, the NMOS transistor cannot be turned on by use of the power supplied from the single-cell fuel cell 1001 or the like by the reason that the voltage thereof is too low. Therefore, it is necessary to turn on the NMOS transistor 1002 at the voltage of the boosted power from the ENCP booster circuit 702 or the SWR booster circuit. In addition, it is necessary to take the power supply for the inverter circuit 1003 from any of the output terminal 224 of the ENCP booster circuit 702, the output terminal 227 of the SWR booster circuit 203, and the power supply terminal 226 of the SWR booster circuit 203. However, in the case of making the power supply for the inverter circuit 1003 common to that for the output terminal 224 of the ENCP booster circuit 702, the ENCP booster circuit 702 is stopped at the time when the boosted power is outputted from the SWR booster circuit 203. Accordingly, the boosted power is not outputted from the output terminal 224 of the ENCP booster circuit 702, and the NMOS transistor 1002 is turned off. The boosted power is not generated from the SWR booster circuit 203 while the NMOS transistor 1002 is being turned off, and accordingly, the operation of the load circuit 104 keeps on being stopped. Further, in the case of making the power supply for the inverter circuit 1003 common to that for the output terminal 227 of the SWR booster circuit 203, when the boosted power is not generated in the output terminal 227 of the SWR booster circuit 203, the NMOS transistor 1002 is turned off without fail. When the NMOS transistor 1002 is turned off, the boosted power is not generated in the output terminal 227 of the SWR booster circuit 203. Therefore, the boosted power is not generated in the output terminal 227 of the SWR booster circuit 203 forever, and the load circuit is also kept in an unoperatable state. In this connection, if the power supply for the inverter circuit 1003 is made common to that for the power supply terminal 226 of the SWR booster circuit 203, first, the NMOS transistor 1002 is turned on at the time when the boosted power of the ENCP booster circuit 702 is supplied to the power supply terminal 226 of the SWR booster circuit 203. In such a way, the boosted power is generated from the SWR booster circuit 203, and the boosted power concerned is supplied to the power supply terminal 226 of the SWR booster circuit 203 through the Schottky diode 732. Accordingly, the NMOS transistor 1002 can keep on being turned on by use of the boosted power concerned. As a result, the load circuit 104 can start the operation, and can continue the operation thereafter.

Further, the configuration is adopted, in which, when the voltage outputted from the input stop signal output terminal 1004 of the load circuit 104 is the "low" voltage equal to that of the GND terminal 108, the ENCP booster circuit 702 is operated, and the NMOS transistor 1002 is turned on. Still further, when the power is supplied from the fuel cell 1001 from the state where the boosted power is not supplied to the load circuit 104 in the state where the power is not supplied from the fuel cell 1001, the boosted power is surely generated, thus enabling the load circuit 104 to be operated. This is also one of the features of the third embodiment of the present invention. This is because, since in the opposite case, even if desired power is outputted from the fuel cell 1001 as the power supply, the respective booster circuits cannot be operated unless the power is given to the load circuit 104 from the outside, the boosted power cannot be obtained, and the load circuit 104 cannot be operated. Specifically, the reason is as follows. When the power is not supplied to the load circuit 104, even if the load circuit 104 is to be operated, the voltage outputted from the input stop signal output terminal 1004 of the load circuit 104 becomes the "low" voltage equal to that of the GND terminal 108. Then, the ENCP booster circuit 702 is brought into a stopped state, and the NMOS transistor 1002 is also brought into a turned-off state. Accordingly, the power is not supplied to the load circuit 104 no matter how long it may be awaited, and the load circuit 104 cannot be operated.

Still further, for the NMOS transistor 1002, a PMOS transistor is not used. With regard to the PMOS transistor, in order to supply the power of the low voltage, it is necessary to add a circuit for negatively boosting the gate voltage thereof or to lower an absolute value of the threshold value although the off-leak is increased. In this connection, it is necessary to increase a circuit scale or to permit the utilization efficiency of the power of the single-cell fuel cell to be lowered. On the contrary, for the NMOS transistor 1002, the NMOS transistor is used, in which the circuit scale is not increased, and the utilization efficiency of the power of the single-cell fuel cell is not lowered. Yet further, the power supply control of the single-cell fuel cell 1001 in the NMOS transistor 1002 is not for the supply to both booster circuits which are the ENCP booster circuit 702 and the SWR booster circuit 203 but for the supply only to the SWR booster circuit 203. In such a way, the load circuit 104 is enabled to be surely operated even from the state where both booster circuits do not generate the boosted power, which is another feature of the third embodiment of the present invention.

Note that the power supply of the present invention is not limited to those described in the respective embodiments. It is needless to say that, even if a power supply is one for generating only power of an input voltage that cannot be converted, by a usual booster circuit, into boosted power at which a usual load circuit can be operated, if the power supply concerned is used as the power supply of each embodiment of the present invention, the power supply can operate the load circuit.

Further, it is needless to say that the configuration of each embodiment described above of the present invention is to create the feature that the load circuit is operated at the low input voltage. If other configurations include a configuration to start and operate the SWR booster circuit in which the starting voltage is low, the configuration being included in each embodiment of the present invention, even if the rest of configurations are different, the rest is added to the configuration concerned. In such a way, it is possible to add features other than the feature that the load circuit can be operated at the low input voltage, which is as described above.

What is claimed is:

1. An electronic instrument, comprising:
   a power supply for supplying power;
   a first booster circuit that is started with the power from the power supply;
   a capacitor for storing power of the first booster circuit;
   a second booster circuit that is started with the power in the capacitor;
   a load circuit operating with power of the second booster circuit;
   a voltage detection circuit for detecting a voltage of the capacitor; and
   a switching element controlled by a voltage detection signal,
   wherein, when determining that the voltage of the capacitor is a predetermined voltage or more, the voltage detection circuit turns off the switching element and starts the second booster circuit with the power of the capacitor.

2. An electronic instrument according to claim 1, wherein the switching element is on until the starting of the second booster circuit ends.

3. An electronic instrument according to claim 1, wherein the first booster circuit stops an operation thereof after the second booster circuit is started.

4. An electronic instrument according to claim 1, wherein the voltage detection circuit has a hysteresis.

5. An electronic instrument according to claim 1, the first booster circuit adopts a boosting mode using a capacitor.

6. An electronic instrument according to claim 1, wherein the first booster circuit is formed of a fully-depleted N-channel type MOSFET using an SOI wafer and a boosting capacitor.

7. An electronic instrument according to claim 1, wherein the switching element comprises a MOS field effect transistor.

8. An electronic instrument according to claim 1, wherein the power supply is any one of a single-cell solar cell, a single-cell fuel cell, a capacitor such as an electric double layer capacitor and a thermoelectric element using the Seebeck effect.

* * * * *